United States Patent [19]

Tauzin et al.

[11] 4,149,471

[45] Apr. 17, 1979

[54] AUTOMATIC GONDOLA FOR AERIAL ROPEWAY, WHICH OPENS AND CLOSES BY ROTATING PORTIONS OF THE PASSENGER COMPARTMENT

[75] Inventors: Francis Tauzin, Veyrins; Paul Genin, Paris, both of France

[73] Assignee: Pomagalski S.A., Fontaine, France

[21] Appl. No.: 819,785

[22] Filed: Jul. 28, 1977

[30] Foreign Application Priority Data

Feb. 4, 1977 [FR] France ................................ 77 03268

[51] Int. Cl.² .......................... B61B 11/00; B60J 5/04
[52] U.S. Cl. .......................... 105/329 S; 104/173 ST; 105/148; 105/339; 105/343; 105/345
[58] Field of Search ............... 105/148, 150, 151, 152, 105/153, 329 R, 329 S, 329 SC, 339, 343, 345, 397; 104/173 ST

[56] References Cited

U.S. PATENT DOCUMENTS

3,556,016  1/1971  Pomagalski et al. ................ 105/150
3,931,769  1/1976  Tauzin ............................... 105/329 S

FOREIGN PATENT DOCUMENTS

163899  8/1949  Fed. Rep. of Germany .......... 105/148
607538  8/1960  Italy ....................................... 105/148

*Primary Examiner*—Francis S. Husar
*Assistant Examiner*—Randolph A. Reese
*Attorney, Agent, or Firm*—William A. Drucker

[57] ABSTRACT

The gondola for an aerial ropeway comprises on a same lateral side two access openings extending from top to bottom and adapted to be cleared by pivotal movements of two portions of the gondola wall. It comprises a central ring rigid with the carrier frame and a pair of molded plastic half-shells constituting these two portions and adapted to pivot about separate axes away from a narrow side of the central ring while surrounding the opposite wide side thereof in order to clear two apertures on each side of a pair of bench seats disposed back to back. This arrangement is applicable to automatic opening and closing gondolas.

4 Claims, 4 Drawing Figures

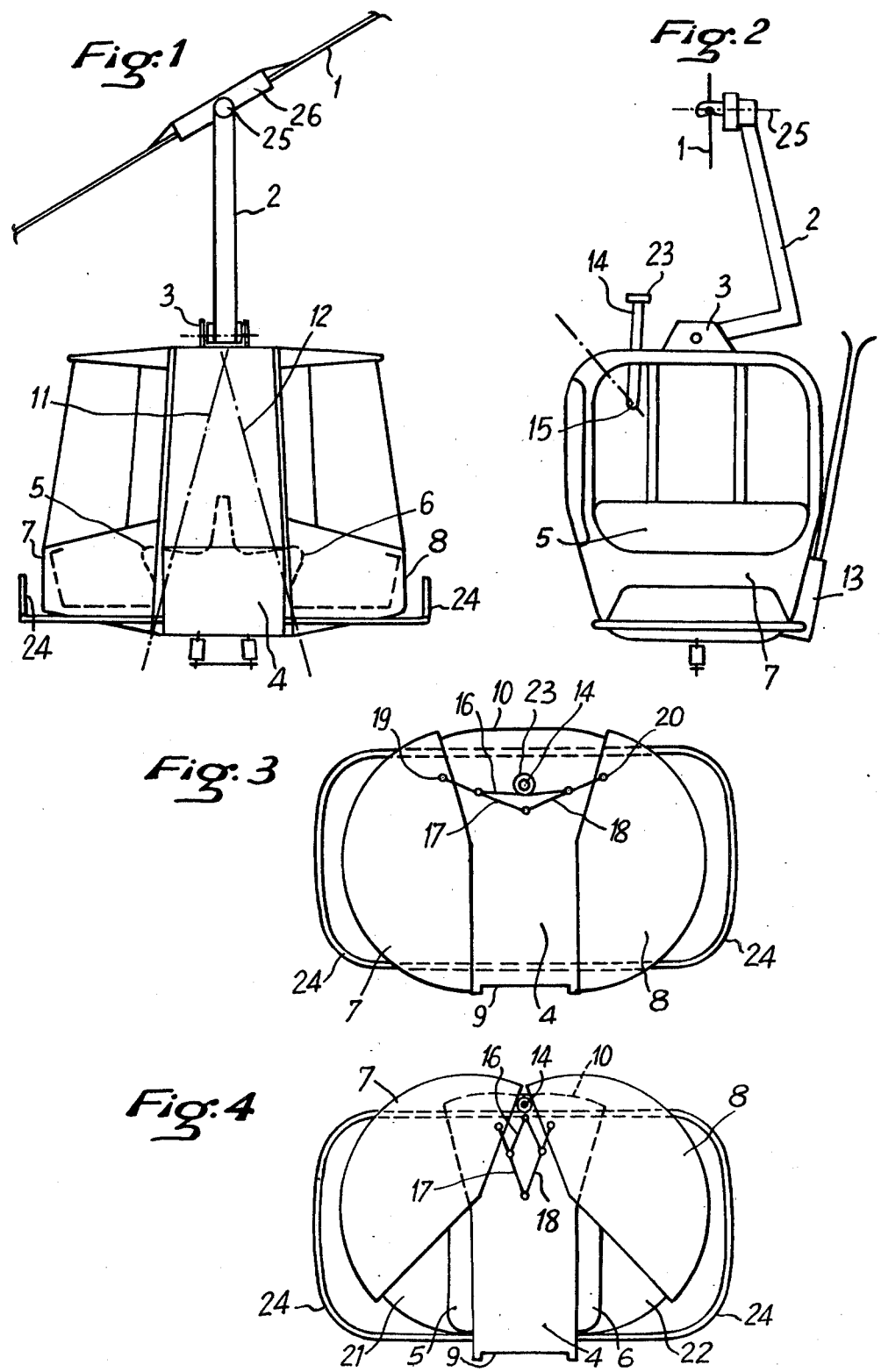

AUTOMATIC GONDOLA FOR AERIAL ROPEWAY, WHICH OPENS AND CLOSES BY ROTATING PORTIONS OF THE PASSENGER COMPARTMENT

BACKGROUND OF THE INVENTION

1. Field of the Invention

The present invention relates to gondolas for aerial ropeways pertaining to the type of equipment intended for transporting passengers between two terminal stations by means of a cable carrying along a plurality of disconnectable gondolas each adapted to carry only a few passengers. The invention relates more particularly to a gondola for rope- or cableways of this type, which comprises on a same lateral side two apertures spaced from each other and permitting the access of passengers to two bench seats disposed traversely back to back so that in front of each seat a wide transparent windshield affords a wide-angle panoramic forward or backward view for the passengers.

2. Description of the Prior Art

A gondola of the general type set forth hereinabove has already been proposed and utilized by the Applicants as recited in the U.S. Pat. No. 3,931,769. In this prior art gondola the lateral apertures are cleared by causing the simultaneous translation of a pair of lateral doors responsive to an automatic control mechanism. Although the exploitation of this gondola is fully satisfactory, notably in that the passengers can step in and out very rapidly and that ski holders can be disposed on the outer surface of the fixed wall disposed between the two apertures, the movements of translation of the doors prevent the passengers from embarking and disembarking in a standing position and make it necessary to provide in the roof an emergency trap for the ingress of possible rescuers into the underlying gondola. On the other hand, the precision required for properly guiding the movements of translation of the lateral doors increases considerably the final manufacturing cost and the maintenance expenses of the gondolas. Finally, the sliding movements of translation of the gondola doors are likely to interfere with the obtaining of the most propitious streamlined shape with a view to minimize the action of wind on the gondolas.

SUMMARY OF THE INVENTION

It is the primary object of the present invention to provide an improved structure for a gondola of the general type set forth hereinabove, wherein the opening and closing movements are still obtained through the use of the automatic control means contemplated in the above-mentioned patent, which proved quite satisfactory in actual practice, while avoiding the opening and closing of said apertures by means of sliding door movements of translation.

It will be noted that aerial gondolas are already known wherein the aperture is obtained by simply causing the gondola to perform a movement of rotation, notably as disclosed in the U.S. Pat. No. 3,556,016 which provides a shell-like gondola with an access door, a lateral opening being obtained by causing a pair of half-shells constituting the entire lateral wall of the gondola to pivot about a vertical lateral axis. However, this structure with a single lateral aperture, adapted more particularly for gondolas designed for carrying only a very small number of seated passengers facing each other, cannot offer to the passengers a truly panoramic and therefore attractive view, and in addition embarking and disembarking passengers through a single aperture constitutes a relatively long operation.

It is obvious that an advantageous arrangement would be obtained in combining a pair of two-seat benches disposed back to back with two lateral apertures and also with simple rotational movements for opening and closing the gondolas, instead of using sliding doors requiring accurate guide means. According to this invention, this arrangement is obtained together with other complementary advantages by providing a gondola for an aerial ferry or the like with a gondola structure comprising a transverse central ring rigid with the carrier frame, said central ring being narrower on one side (the access and exit side) than the opposite side, and a pair of half-shells made of molded plastic material which surround the passenger compartment at its front and rear ends, said half-shells being adapted to pivot about vertical axes located in the vertical median plane of the gondola so as to uncover on a same side of the gondola a pair of access openings or cut-outs formed in the wall of the gondola on each side of the narrow side of the central ring, the same half-shells covering externally on the opposite side the wide portion of said ring on surface areas equal to the cut-out opening surface areas.

Thus, the gondola can be opened and closed automatically by means of a mechanism very similar to the one already known in the art, for example as disclosed in the above-mentioned U.S. Pat. Nos. 3,556,016 and 3,931,769. Moreover, the structure contemplated in the present patent is such that the gondola dimensions can be kept to a minimum in the open position of said half-shells, in contrast with the known arrangement wherein the two half-shells are moved away from each other at their junction plane, on the side of the aperture to be opened or cleared, which arrangement does not provided two separate accesses in order to reduce the time necessary for the passengers to step in or out. Another feature characterizing the improved structure according to this invention is that the fixed median or central wall can be preserved, the outer surface of this wall being adapted, if necessary, to carry a ski-holder between the two apertures.

A further advantage resulting from the structure of this invention is that, according to a complementary feature characterizing this invention, the opening and closing movements are facilitated due to the pivotal mounting of the pair of half-shells about axes disposed in the vertical median plane of the gondola but slightly inclined to the vertical so as to converge upwardly toward each other, whereby, during an opening movement as well as during a closing movement, the centers of gravity of the pair of half-shells describe each a path of circular arc configuration in a slightly inclined plane of which the ends lie at lower points substantially symmetrical to the vertical median longitudinal plane of the gondola. Thus, any opening or closing movement is started against the action of gravity forces but ends with the assistance of this gravity action so that the half-shells are urged either to their fully closed position or to their fully open position by said gravity forces. In other words, the end positions are both stable ones and the opening and closing movements constantly tend to take place completely after clearing a dead center point located substantially in the middle of the corresponding movement. Therefore, the action of the gravity forces will assist the action of the spring means incorporated in the automatic control device which may thus be simplified and operate with the maximum reliability under all circumstances.

BRIEF DESCRIPTION OF THE DRAWING

FIG. 1 is a side elevational view of an aerial gondola constructed according to the teachings of this invention;

FIG. 2 is a front elevational view of the same aerial gondola;

FIG. 3 is a plan view from above showing the gondola in its closed condition, and FIG. 4 is a plan view from above showing the same gondola in its open condition.

DESCRIPTION OF THE PREFERRED EMBODIMENT

Referring first to FIGS. 1 and 2 of the drawing, the aerial gondola for ropeway systems according to this invention comprises a carrier rope or cable 1, a suspension arm 2 from which the gondola proper is suspended, this arm 2 being pivoted on the one hand at its bottom via a longitudinal fulcrum pin of a yoke 3 carried by the central ring or belt 4 of the gondola and on the other hand at the top via another fulcrum pin having a transverse axis 25 rigid with the clamp 26 provided for locking the gondola to the rope 1. This arrangement is designed for minimizing the risk of collision with the iron framework towers for a same transverse distance between the vertical plane of rope 1 and the towers supporting said rope.

The central ring or belt 4 of the gondola is rigid with the frame structure thereof which supports the pair of two-seat benches 5, 6 disposed back to back. Facing each seat is a relatively wide windshield with transparent glazing incorporated in a corresponding half-shell constituting the compartment for the passengers seated on the corresponding bench seat. The pair of half-shells designated at 7 and 8 in FIG. 1 are movable in order to clear the access or exit to and from the gondola, as will be explained presently.

As shown in FIGS. 3 and 4, the central ring or belt 4 is narrower on one side 9, between the accesses, than on the opposite side 10, and the pair of half-shells 7,8 completing the gondola housing can pivot between closed and open positions, and vice versa, about axes 11,12 slightly inclined to the vertical, respectively. The narrow side 9 of fixed ring 4 may advantageously carry on its outer surface a ski holder 13 (shown only in FIG. 2 to avoid unnecessary drawing complications).

At its top the central ring 4 carries the automatic control lever 14 shown in its closed position in FIGS. 2 and 3 and in its open position in FIG. 4. This lever is fulcrumed about a fixed pivot pin 15 and adapted to oscillate in a transverse plane in order to actuate a mechanism 16 of which the actuating rods 17,18 (shown only diagrammatically in FIGS. 3 and 4) are pivoted at 19,20 respectively to the pair of half-shells 7,8 to permit the pivotal movements thereof about their axes 11,12. Therefore, during the opening movement the half-shells 7,8 move away from the narrow side 9 of ring 4 (FIG. 4), thus clearing the apertures 21 and 22, while on the opposite side the walls of the two half-shells surround externally the wide side 10 of ring 4. The cleared apertures 21,22 are wedge-shaped and extend upwards on the top of the gondola (i.e. above the seat halves located on the access side of the gondola), whereby the occupant can embark or disembark without leaning; furthermore, these apertures 21,22 are such that access to the inside of the gondola can be had from the top thereof in case of emergency, thus permitting a rapid intervention of rescuers in a gondola brought to a standstill or locked against movement between two terminal stations.

The automatic control mechanism is very similar to the one well known in the art and therefore its detailed description is not deemed necessary inasmuch as it is no part of the present invention. Suffice it to say that this automatic control mechanism is actuated by means of the above-mentioned lever 14 responsive to the action of automatic control ramps or cam members provided for this purpose at the terminal stations and adapted to engage and push the end roller 23 carried by the top of said lever 14 outwards according to the well-known principle.

The axes 11,12 about which the two half-shells are pivotally mounted to the fixed structure comprising the carrier frame and the central ring 4 are disposed substantially in the longitudinal median plane of the gondola, and inclined preferably to converge upwards as shown in FIG. 1. As illustrated in FIGS. 3 and 4, these axes are selected in combination with the curved contour of the gondola half-shells so that the latter perform their movements of rotation substantially within a space of which the over-all dimensions do not exceed appreciably those of the gondola in its closed condition (FIG. 3). Moreover, as already mentioned in the foregoing, as a consequence of the inclination of axes 11,12 with respect to the longitudinal vertical median plane, the center of gravity of each half-shell is caused to move during each opening or closing movement along a part-circular path rising from its ends to an intermediate, dead-center forming point beyond which the gravity forces urge the corresponding half-shell in the direction to complete the movement thus started of which the two ends constitute stable positions.

The reference numeral 24 designates front and rear bumpers as usually provided on gondolas of this type.

Although a specific form of embodiment of this invention has been described hereinabove and illustrated in the accompanying drawing, it will readily occur to those skilled in the art that various modifications and changes may be brought thereto without departing from the scope of the invention as set forth in the appended claims.

What we claim is:

1. A gondola, for an aerial ropeway, comprising:
   (i) an arm for connection at an upper end thereof to a carrier cable of the ropeway
   (ii) a body structure including a carrier frame having front and rear ends, a transverse median ring secured to said frame and having opposed lateral faces one of which is narrower than the other, said ring being connected to a lower end of said arm, and a pair of seating means disposed back to back in said frame between said opposed lateral faces of said ring and each facing a respective end of the frame
   (iii) a pair of shells disposed one at each side of said median ring and each forming, with a respective portion of the carrier frame, a respective front and rear passenger compartment, each of said shells being pivoted to said ring for movement about a respective axis, disposed in a vertical median plane of the gondola, into a closed position in which first and second opposed lateral edges of the shell are respectively adjacent to said narrower face and said other face of the ring, and into an open position in which said first lateral edge is spaced from said narrower face to provide an access opening to a respective compartment, and said second lateral edge has moved across said other face of the ring, (iv) a control lever pivoted on and external of said ring, said lever being connected by linkage to both of said shells for movement of said shells in unison into their open and closed position.

2. A gondola, as claimed in claim 1, wherein the respective axes of pivoting of the two shells, converge upwardly and are both inclined to the vertical such that, during opening and closing movements of the shells, the center of gravity of each shell describes a part-circular path the end points of which path are lower than the intermediate portion and are at substantially symmetrical positions in relation to the longitudinal median plane of the gondola.

3. A gondola, as claimed in claim 2, wherein said median ring has a yoke at its upper part, and said arm is pivoted to said yoke by a pivot disposed longitudinally of the carrier frame, and wherein there is provided a clamp for locking the gondola to the carrier cable, said arm being pivoted to said claim by a pivot pin disposed transversely of the carrier frame.

4. A gondola, as claimed in claim 1, wherein said median ring has a yoke at its upper part, and said arm is pivoted to said yoke by a pivot pin disposed longitudinally of the carrier frame, and wherein there is provided a clamp for locking the gondola to the carrier cable, said arm being pivoted to said clamp by a pivot pin disposed transversely of the carrier frame.

* * * * *